United States Patent [19]
Sukeda et al.

[11] Patent Number: 5,854,997
[45] Date of Patent: Dec. 29, 1998

[54] ELECTRONIC INTERPRETER UTILIZING LINKED SETS OF SENTENCES

[75] Inventors: Hiroko Sukeda, Tokorozawa; Yoshiyuki Kaneko, Hachioji; Tetsuya Nakagawa, Koganei; Muneaki Yamaguchi, Kokubunji; Toshihisa Tsukada, Musashino, all of Japan

[73] Assignee: Hitachi, Ltd., Tokyo, Japan

[21] Appl. No.: 524,836

[22] Filed: Sep. 7, 1995

[30] Foreign Application Priority Data

Sep. 7, 1994 [JP] Japan ................................. 6-213437

[51] Int. Cl.$^6$ ..................................................... G06F 17/28
[52] U.S. Cl. ..................... 704/3; 704/7; 704/8; 707/536; 345/173
[58] Field of Search ..................................... 395/752, 753, 395/754; 361/681, 682, 683, 686; 364/710.11, 710.14; 345/1, 171, 173; 704/2, 3, 4, 7; 707/536

[56] References Cited

U.S. PATENT DOCUMENTS

| | | | |
|---|---|---|---|
| 4,412,305 | 10/1983 | Yoshida | 395/754 |
| 4,503,426 | 3/1985 | Mikulski | 345/171 |
| 4,686,332 | 8/1987 | Greanias et al. | 345/173 |
| 4,730,270 | 3/1988 | Okajima et al. | 395/752 |
| 4,733,368 | 3/1988 | Morimoto et al. | 395/757 |
| 4,894,779 | 1/1990 | Suzuki et al. | 395/752 |
| 5,075,850 | 12/1991 | Asahioka et al. | 395/752 |
| 5,136,505 | 8/1992 | Inamori et al. | 395/754 |
| 5,268,839 | 12/1993 | Kaji | 395/753 |
| 5,295,068 | 3/1994 | Nishino et al. | 395/760 |
| 5,351,189 | 9/1994 | Doi et al. | 395/753 |
| 5,467,102 | 11/1995 | Kuno et al. | 345/1 |
| 5,523,943 | 6/1996 | Maruta et al. | 395/754 |

FOREIGN PATENT DOCUMENTS

| | | |
|---|---|---|
| 0 138 619 A2 | 4/1985 | European Pat. Off. . |
| 56-88564 | 7/1981 | Japan . |
| 64-79866 | 3/1989 | Japan . |

OTHER PUBLICATIONS

"Translator Product Catalog" published by Fuji Xerox, Jul. 1994.

*Primary Examiner*—David R. Hudspeth
*Assistant Examiner*—Jospeh Thomas
*Attorney, Agent, or Firm*—Antonelli, Terry, Stout & Kraus, LLP

[57] ABSTRACT

An electronic interpreter for interpreting sentences between a first person and a second person. The electronic interpreter includes a memory for storing sentence data in a data structure having a plurality of sets of sentences including translations of the sentences, wherein each sentence of each set of sentences is linked to another of the sets of sentences, and a data processing unit. The data processing unit retrieves a set of sentences from the memory in response to a keyword input from the first person using an input device, displays the set of sentences on a display, selects a sentence from the set of sentences in response to an input from the first person using the input device, displays a translation of the selected sentence on the display along with another set of sentences linked to the selected sentence, selects a sentence from the another set of sentences in response to an input from the second person using the input device, displays a translation of said selected sentence on the display along with another set of sentences linked to the selected sentence, and repeats all of the previous operations continually until a keyword has been input from the first person using the input device.

30 Claims, 11 Drawing Sheets

725' — WHERE IS THE RESTROOM ?

○ [WHILE POINTING] IT IS OVER THERE. ～731
○ [POINTING] THIS WAY, IT'S ON THE RIGHT ～732
○ [POINTING] THIS WAY, IT'S ON THE LEFT ～733
○ I'M SORRY, I'M NOT FROM HERE. ～734

PLEASE CHOOSE A SENTENCE BY TOUCHING IT.

WHERE IS THE RESTROOM ? ～725'

○ [WHILE POINTING] IT IS OVER THERE.
● [POINTING] THIS WAY, IT'S ON THE RIGHT.
○ [POINTING] THIS WAY, IT'S ON THE LEFT.
○ I'M SORRY, I'M NOT FROM HERE.

732

[POINTING] THIS WAY, IT'S ON THE RIGHT. 409

THE CHOSEN SENTENCE IS

[POINTING] THIS WAY, IT'S ON THE RIGHT.

IF YOU MADE A MISTAKE IN CHOOSING A SENTENCE, TOUCH HERE.

ELECTRONIC INTERPRETER UTILIZING LINKED SETS OF SENTENCES

BACKGROUND OF THE INVENTION

The present invention relates to an electronic interpreter for assisting persons who speak different languages to communicate with each other. More particularly the present invention relates to a bidirectional, portable electronic interpreter that searches for a sentence that is well suited to the context of a conversation and produces an audio and visual output.

Electronic interpreters for use during conversations are known. A portable electronic interpreter as disclosed in Japan Patent Laid-Open No. 56-88564 displays example sentences when a category is specified and, when one of the displayed sentences is selected, produces as an audio output a translated sentence of the selected sentence. The portable electronic interpreter also has a function of replacing and inserting words in a sample sentence.

Another example of an electronic interpreter, disclosed in Japan Patent Laid-Open No. 64-79866, assists conversation between the user and the companion by using a translation dictionary.

By use of the conventional electronic interpreter described by Japan Patent Laid-Open No. 56-88564, which makes use of the method of selecting one sentence from among a plurality of prepared sentences and outputting a translation of the selected sentence, it is possible to convey the intention of the user of the electronic interpreter to the companion of the conversation by searching a desired sentence matching the situation and keywords. However, the problem occurs when the companion replies to the user. Specifially, the user may be unable to understand the reply from the companion and cannot continue their conversation.

By use of the above-described conventional electronic interpreter disclosed by Japan Patent Laid-Open No. 64-79866, which makes use of a translation dictionary for translating sentences bidirectionally, the translation processing is complex, making the device large and costly. Therefore, such an electronic interpreter is unsuitable as a portable, inexpensive device intended for general use.

SUMMARY OF THE INVENTION

An object of the present invention is to provide an electronic interpreter for interpreting sentences between a first person and a second person.

Another object of the present invention is to provide an electronic interpreter which is compact for portable use and is simple to use.

Yet another object of the present invention is provide an electronic interpreter which permits a user to easily convey his intention to the companion of a conversation and to permit the companion of the conversation to reply to the user in a manner understandable by the user.

The present invention provides an electronic interpreter for interpreting sentences between a first person and a second person by allowing the first and second person to select from among a plurality of prepared sentences. In the electronic interpreter of the present invention, the data of sentences is stored in memory in a data structure which includes a plurality of sets of sentences including translations of the sentences. Each sentence of each set of sentences is linked to another set of the sets of sentences. Each set of sentences matches a situation requiring likely set of sentences to be exchanged during the course of conversation.

Here, a set of sentences which are related to each other and include common terms is designated as a card. Each sentence belongs to one card and the data on the sentences is defined recurrently. That is, a card correlated as candidates of a reply to a sentence further contains at least one sentence, which in turn holds a link to another card. A sentence that represents category information, i.e., a keyword for retrieving sentences, is regarded as a sentence. A set of sentences retrieved by use of the keyword is defined as a linked card.

The electronic interpreter of the present invention is implemented as a data processing unit which includes at least a display for displaying a set of sentences, the contents of a card, an input device for allowing the user or companion of a conversation to select a sentence from among the set of sentences, and a data processing unit for displaying on the display a translation of the selected sentence or producing an audio output of the translation of the selected sentence. The display is divided into at least two areas, one of which is used by the user and the other of which is used by the companion. Example sentences or translations in a first language are displayed in a first display area, while example sentences or translations in a second language corresponding to the example sentences or translations in the first language are displayed in a second display area.

When a keyword in the first language displayed on the first display area is selected by the input device, the data processing unit displays on the first display area the card linked to the keyword, i.e., a set of sentences in the first language retrieved by use of the keyword. When one of the sentences in the first language is selected, the data processing unit displays the translation of the selected sentence in the second language on the second display area and/or produces, utilizing the audio output device, an audio output of the translation, and displays on the second area a card of a set of answer sentences (in second language) corresponding to the selected sentence. Because each of the sentences has a recurrent link to its translation and to a correlated card, each time the user or companion selects one sentence, its translation is displayed and/or an audio output is produced and its correlated card is displayed, thus permitting the conversation to proceed in two languages. Since the display area is divided according to languages, information needed by the user and the companion are displayed separately, so that the thinking of each is not interrupted or interfaced with, allowing smooth conversation between the user and the companion.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Figure 1:
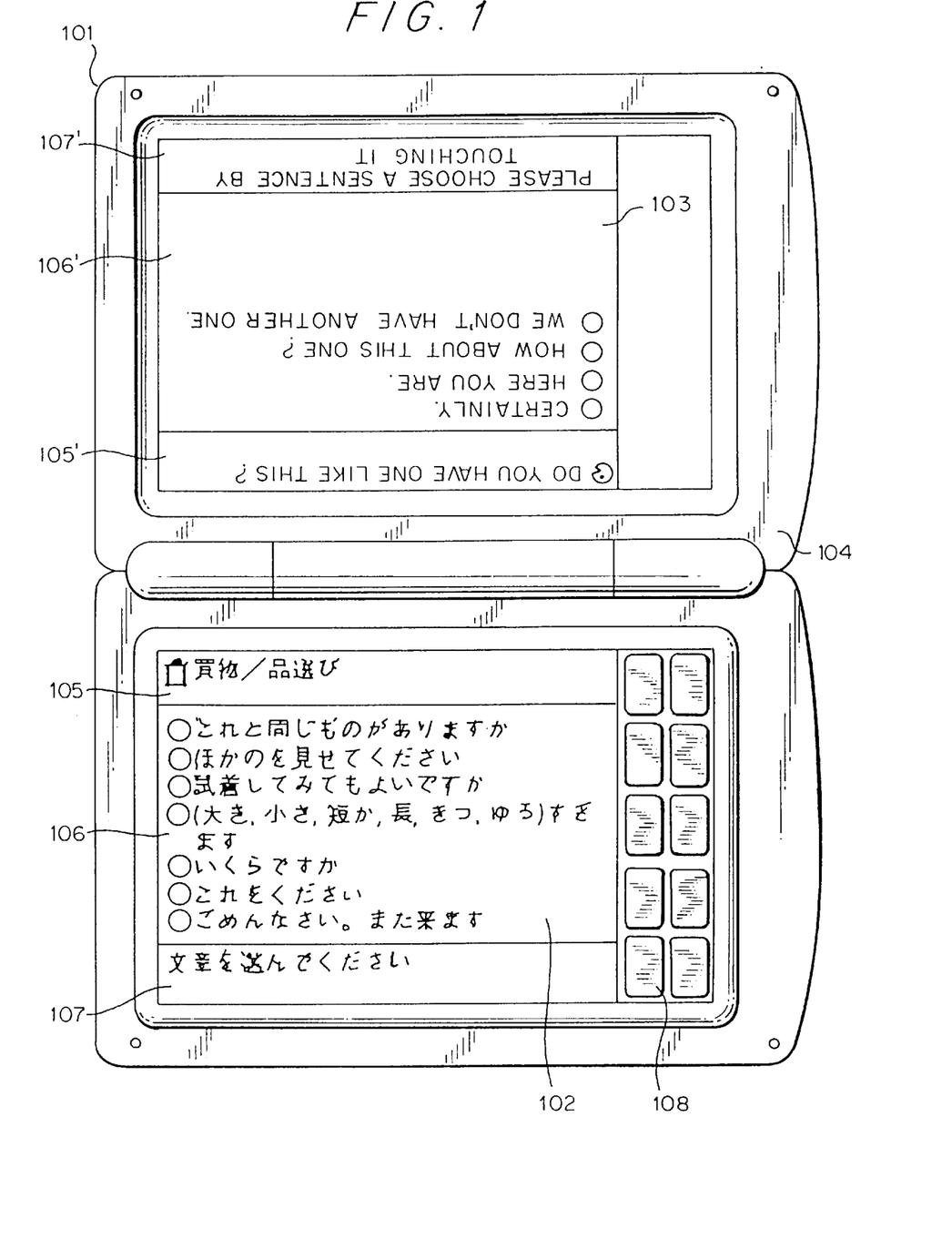
FIG. 1 is a diagram illustrating an external view of an electronic interpreter of the present invention.

One embodiment of this invention will be described referring to FIGS. 1 through 9. FIG. 1 illustrates an external view of an electronic interpreter as a first embodiment of the present invention. This embodiment is shown as a portable electronic interpreter used to assist a user whose native language is Japanese in talking to a person who understands English.

It should be noted that the drawings, for example FIG. 1, are illustrated using Hiragana, Katakana and Kanji characters. Hiragana is a phonetic syllabary used by Japanese for writing. The symbols are curvalinear in style. Katakana is the second syllabary used in Japanese writing primarily for foreign names and place names and words of foreign origin. The symbols are made up of straight lines. Kanji are Chinese characters or ideographs, each conveying an ideal, most of which have at least two readings. The Hiragana, Katakana and Kanji characters are used in the drawings so as to clearly illustrate the actual use of the present invention which provides, for example, a translation from Japanese to English. Other such characters may be used, such as Russian, Korean, Arabic or the like. The present specification, instead of using the actual Hiragana, Katakana and Kanji characters illustrated in the drawings, makes use of Romaji which is a manner of transliterating Japanese using the Roman alphabet. Thus, the Romaji terms used in the specification correspond to the Hiragana, Katakana and Kanji terms used in the drawings.

It should be further noted that since the present invention provides for interpretation, such interpretations may be, for example, from Japanese characters written in Hiragana or Katakana to Japanese characters written in Romaji. Thus, the present invention can provide for the translation from one character or transliterating system to another character or transliterating system.

In FIG. 1, electronic interpreter 101 includes two displays 102, 103 and a speaker 104 that outputs a translated sentence in voice form. The electronic interpreter can be folded and closed for carrying and, when it is used, can be opened thus permitting effective use of the two displays. The displays 102, 103 are a combination of a liquid crystal display and a touch sensing panel. The touch sensing panel allows the user to select an object such as a sentence by pressing a finger or pen against the object on the display and releasing it.

The present invention can also be operated wherein the liquid crystal display is not provided with a touch sensing panel but is instead provided with a keyboard positioned adjacent to each of the displays. The keyboard provided separate from the display can be used by the user of the electronic interpreter or a companion of the conversation with the user to input data or instructions from the user and the companion.

The displays 102, 103 are arranged so that the top and bottom of one display are inverted relative to the other display. That is, the display 102 shows information in Japanese toward the user of the electronic interpreter and the display 103 shows information in English toward his/her companion. The displays 102, 103 are each divided into three display areas, namely a header area 105, 105' for displaying a keyword (in many cases, a conversational situation) for retrieving translated sentences or sample sentences, a text area 106, 106' for displaying sentences from which the user or companion can select and a footer area 107, 107' for displaying a message or a mark for special processing. The display 102 for the user is provided with menu button icons 108. On each of the menu button icons is provided a situation keyword or a function for retrieval of sentences and for calling up a special function.

Figure 2:
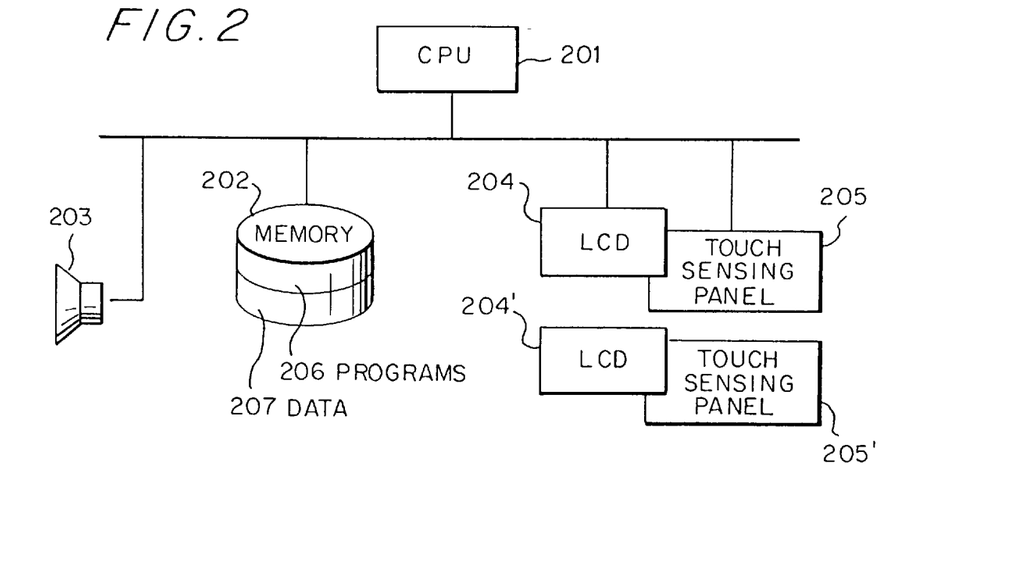
FIG. 2 is a schematic diagram illustrating a hardware configuration of the electronic interpreter of the present invention.

FIG. 2 shows a schematic diagram of a hardware configuration of the electronic interpreter. The electronic interpreter includes a CPU 201 for controlling the electronic interpreter, a memory 202 for storing programs and data, a speaker 203 for producing a voice output, two liquid crystal displays 204, 204' for displaying sentences and so on, and two touch sensing panels 205, 205' for selecting a sentence. As described above, the touch sensing panels 205, 205' may each be replaced by a keyboard (not shown) separate from the displays 204, 204' for performing the same function. The liquid crystal display 204 and the touch sensing panel 205 are used in combination and similarly the display 204' and touch sensing panel 205' are used in combination. The memory 202 stores programs 206 for controlling processing and data 207 on sentences and speech. The programs 206 are loaded when the power is turned on.

Figure 3:
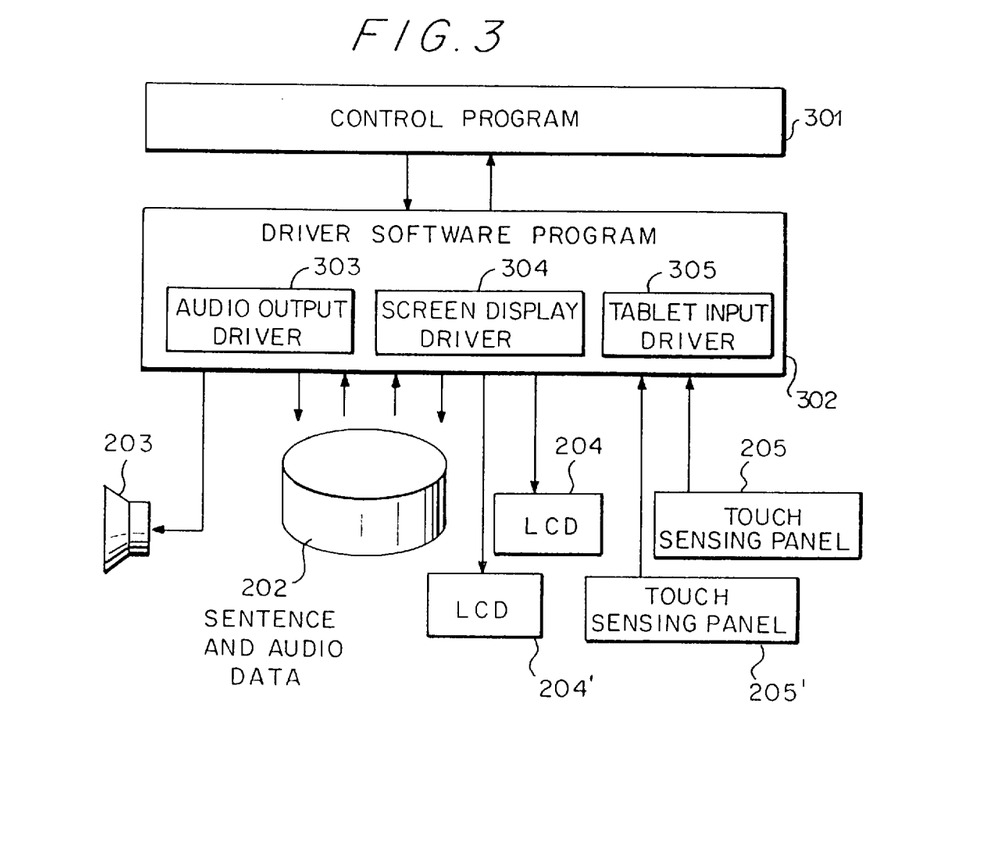
FIG. 3 is a schematic diagram illustrating a system configuration and data flow of the present invention.

FIG. 3 illustrates the system configuration and data flow of the present invention. The entire processing is controlled by a control program 301. The control program 301 controls the display and selection of sentences by calling up the driver software program 302 which directly controls the hardware. The driver software program 302 includes three programs, an audio output driver program 303, a screen display driver program 304, and a tablet input driver program 305. The audio output driver program 303, in response to an audio output instruction from the control program 301, retrieves audio data from the memory 202 where audio data is stored, and outputs the audio data through the speaker 203. The image display driver program 304, in response to a screen display instruction from the control program 301, retrieves data of a set of sentences to be displayed from the memory 202 and displays them on the liquid crystal display 204 or 204'. The tablet input driver program 305 receives input from touch sensing panels 205, 205' and provides an output related to the input received from the touch sensing panels 205, 205' to the control program 301.

The operation of the electronic interpreter will be explained referring to FIGS. 4A–4C to 6A and 6B and 7. FIGS. 4A–4C, 5A–5C and 6A–6B show a series of displays in the order of a conversation being conducted between a user and a companion using the electronic interpreter. While the actual displays are so arranged that the display for the user and the display for the companion oppose each other, as shown in FIG. 1, FIGS. 4A–4C, 5A–5C to 6A–6B show the two opposing displays arranged side by side for the sake of convenience. A finger pointer 409 is used to select a sentence or menu button icon. FIG. 7 shows the relation between card data and sentence data corresponding to the proceedings of the conversation shown in FIGS. 4A–4C to 5A–5C and 6A and 6B. A card is a collection of correlated sentences and is called up by a menu button icon or a sentence. The arrows in the figure represent links to the cards from predefined menu button icons and sentences. By following the links, a card to be displayed next is called up.

Figure 4A:
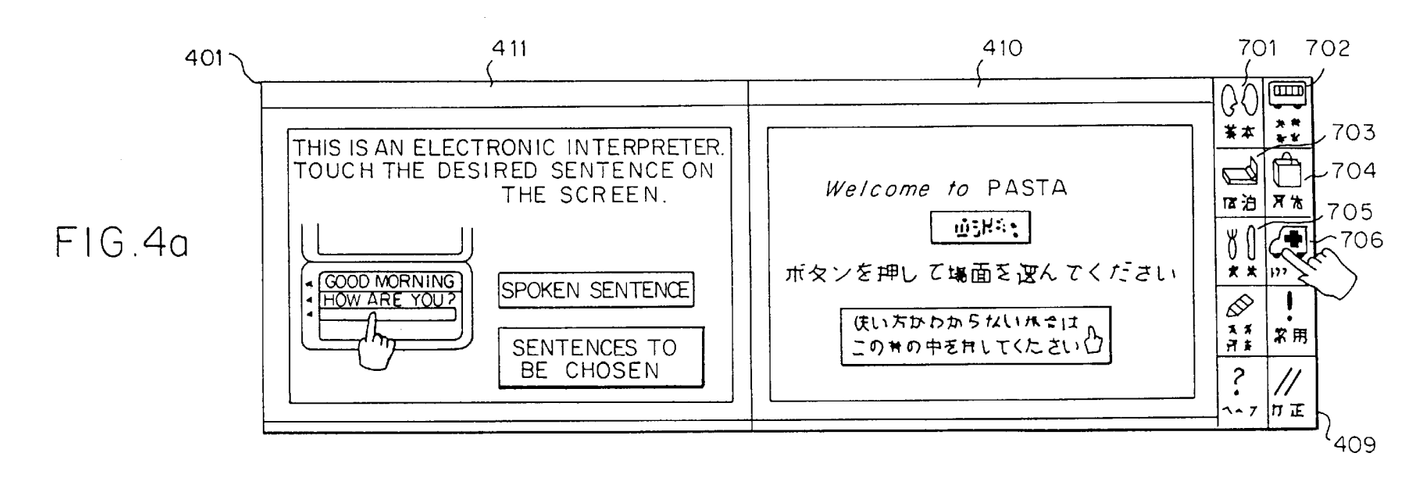
FIGS. 4A–4C are diagrams illustrating a sequence of displays of the electronic interpreter of the present invention during conversation.
Figure 4B:
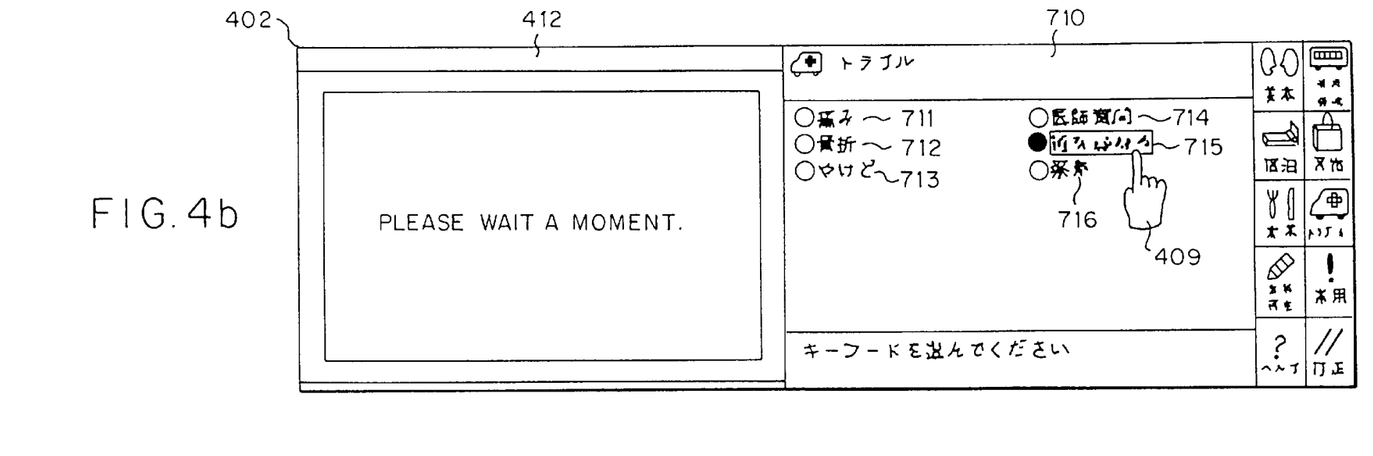
Figure 4C:
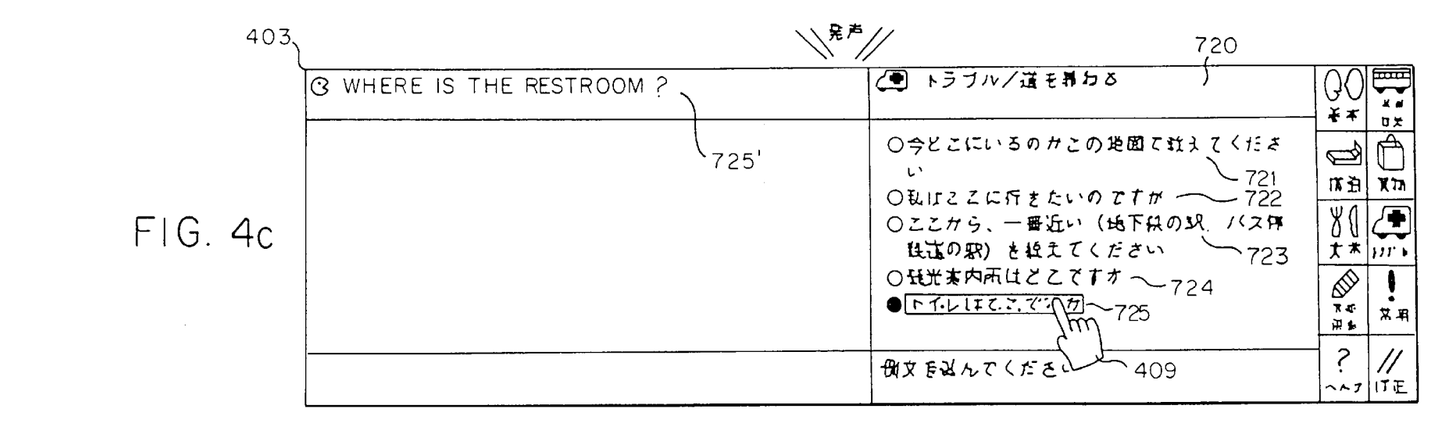

As shown at the initial state 401 of FIG. 4A, when the power of the electronic interpreter is turned on, initial screens 410, 411 are displayed on the liquid crystal displays for the user and for his/her companion. Then, the user is prompted to select one of menu button icons 701, 702, 703, 704, 705, 706 on the right-hand side of the screen. Here, the user selects, for example, a menu button icon 706 (see the finger pointer 409) having an indication "Toraburu". In FIG. 7, this operation corresponds to a shaded menu button icon 706. For the menu button icon 706 a link to a card 710 for keyword selection is defined and therefore the card 710 is called up. Next, at 402 of FIG. 4B, the card 710 called up by the "Toraburu" menu button icon 706 appears on the display for the user. The card 710 includes sentences 711, 712, 713, 714, 715, 716, which are the keywords for retrieving sentences (see card 710 of FIG. 7). During this display, a bit-map image 412 "Please wait a moment" is displayed on the display for the companion. Here, the user selects a sentence 715, "Michi wo tazuneru".

FIG. 7 shows that the sentence 715 is linked to a card 720. Hence, at the state 403 of FIG. 4C, the card 720 appears on the display for the user. The card 720 includes five sentences, which are sample sentences which are appropriate for the context of the conversation. In addition to ordinary sentences such as 721, 722, 723, 724, it is possible to define such a sentence 725 which includes choices. Here, assume that the user selects a sentence 725, "Toire wa dokodesuka". Then, on the companion's display, the English translation 725' of the sentence 725, "Where is the rest room?" appears and at the same time it is voiced.

As shown in FIG. 7, the sentence 725 has a link to a card 730 to be displayed on the companion's screen. Hence, the card 730 appears on the display for the companion FIG. 5A, 404. The card 730 includes candidate answers (sentences 731, 732, 733, 734) to the question "Where is the rest room?". During this display, on the display for the user, a screen 413 for confirming the selected sentence is shown. The screen 413, unlike the screen on which ordinary sentences are displayed, is formed of a bit-mapped image. With this screen, it is possible to check if the selected sentence is exactly the one the user wants and to change the selection and explain to the companion how to use the interpreter. Because the user cannot confirm if he or she has made a correct selection of a sentence only by hearing the voiced translation, the display of the selected sentence for allowing the user to check his or her selected sentence and to redo the selection as necessary is convenient. When the companion selects a sentence, the selected sentence is of course displayed on the companion's screen. This advantage of smooth conversation is realized by the use of two screens.

Figure 5A:
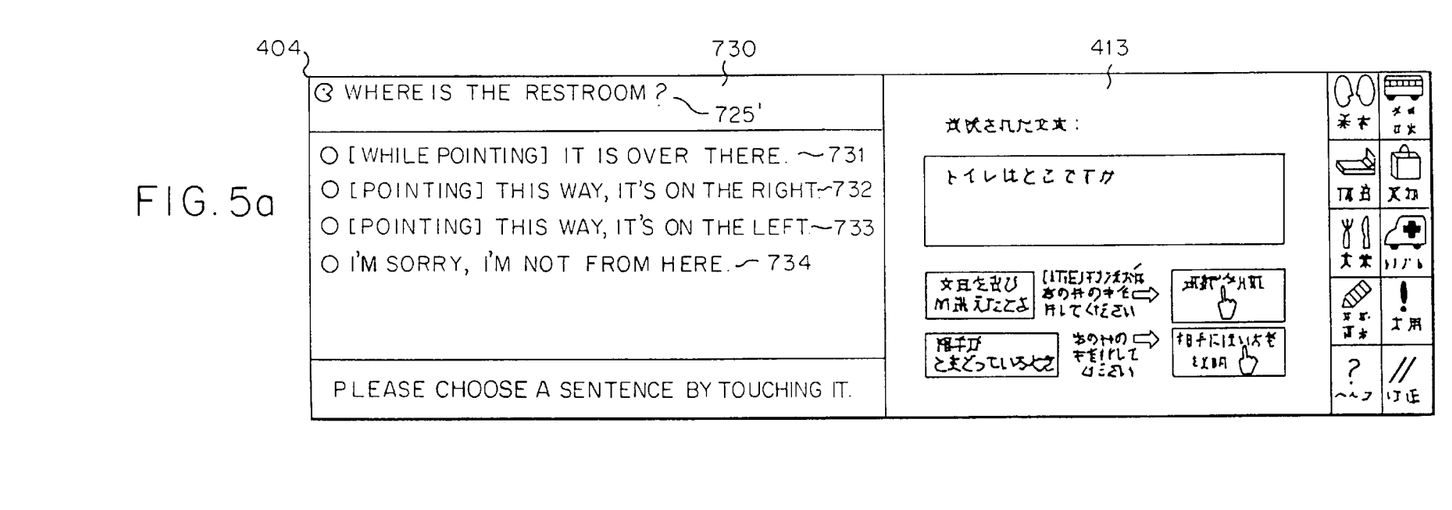
FIGS. 5A–5C are diagrams illustrating a sequence of displays of the electronic interpreter of the present invention during conversation.
Figure 5B:
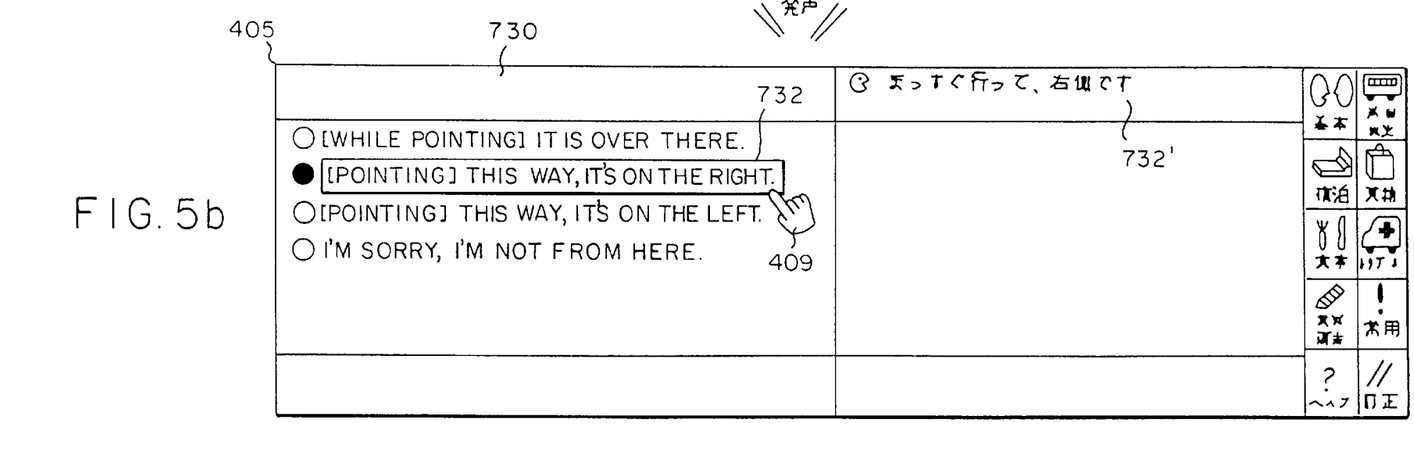
Figure 5C:
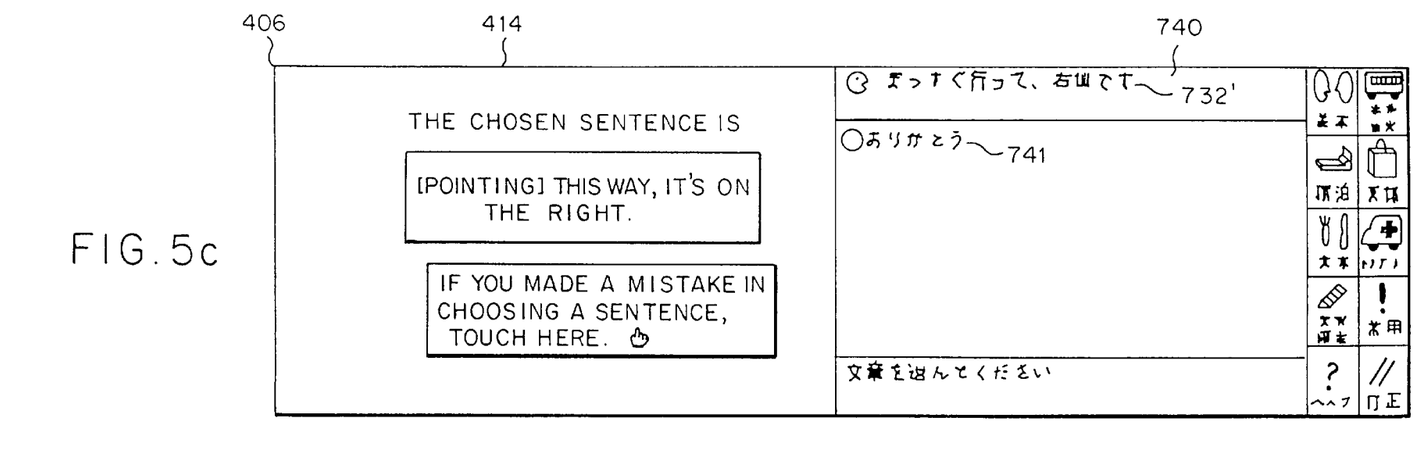

It is now the companion's turn to choose a sentence from among the displayed candidate sentences to reply to the question "Where is the rest room?". This is shown in FIG. 5B, at 405. The companion selects a sentence 732 "[Pointing] This way, it's on the right.". Then, a sentence 732', the translation in Japanese of the sentence 732, appears on the user's screen and is voiced at the same time. FIG. 7 shows that a card linked with the sentence 732 is a card 740, which is displayed on the user's screen. This card 740 contains only one sentence 741. Hence, in FIG. 5C at 406, the card 740 including the Japanese sentence 741, "Arigato" is displayed on the user's screen. During this display, on the companion's screen a confirmation screen 414 similar to the Japanese confirmation screen 413 is displayed.

Figure 6A:
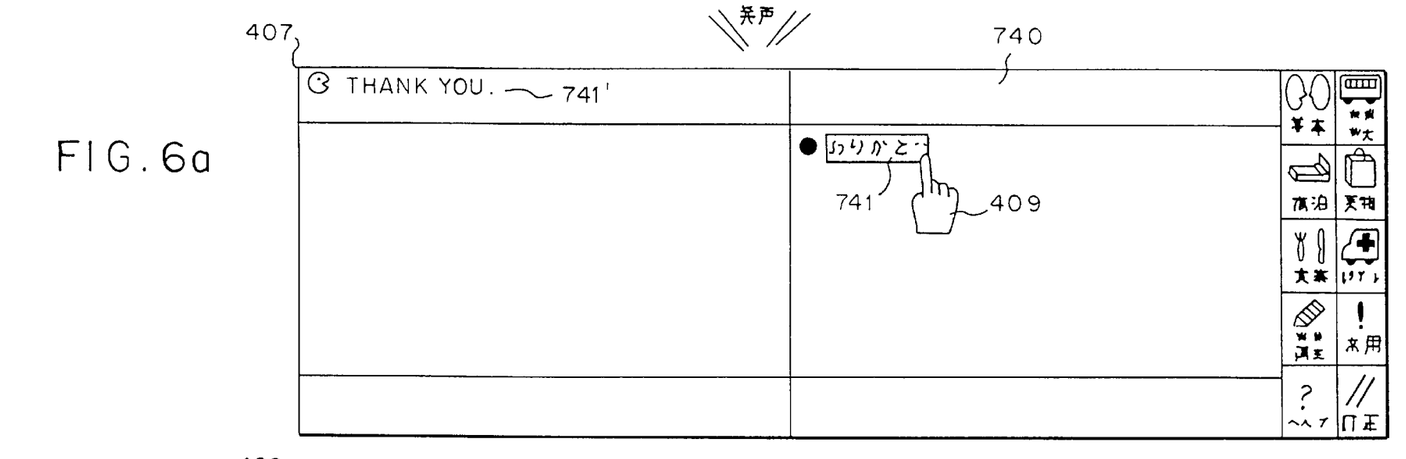
FIGS. 6A and 6B are diagrams illustrating a sequence of displays of the electronic interpreter of the present invention during conversation.
Figure 6B:
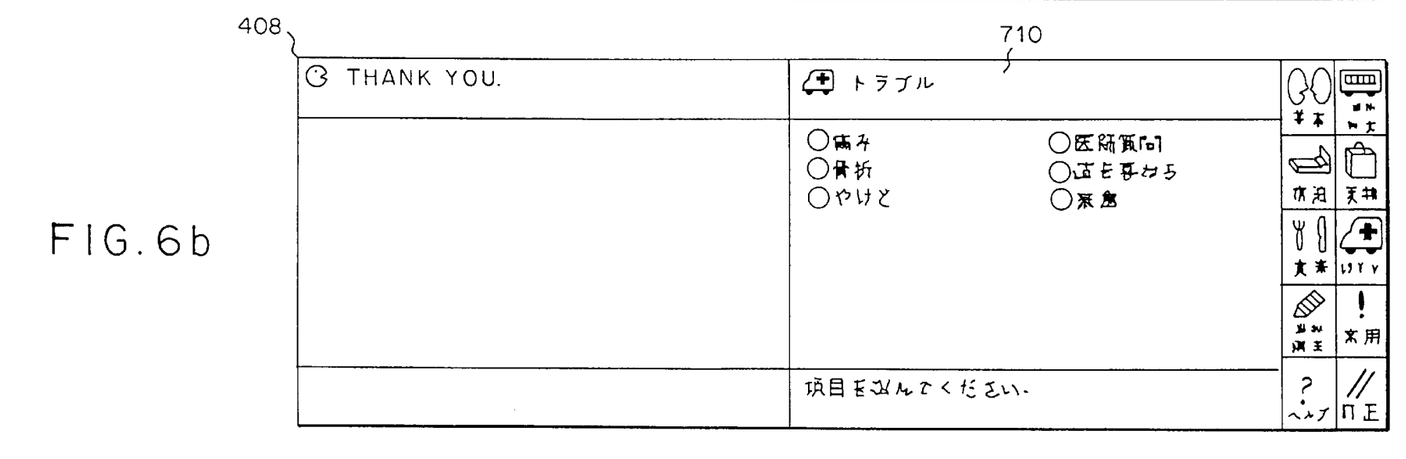
Figure 7:
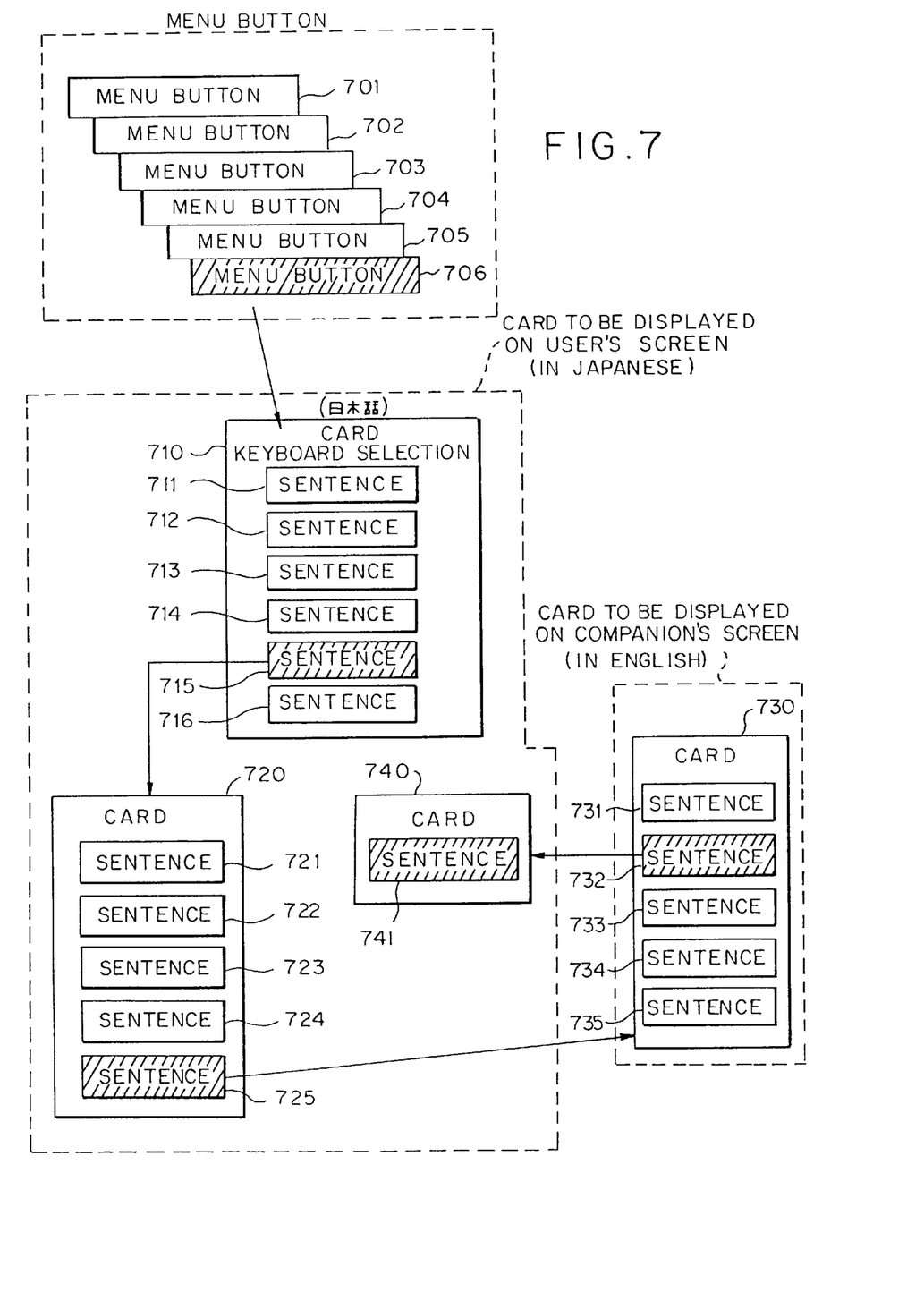
FIG. 7 is a schematic diagram illustrating the relation between cards and sentences in the present invention.

In FIG. 6A at 407, the user selects the Japanese sentence 741, "Arigato". The English sentence of the sentence 741 is displayed on the companion's screen and voiced. FIG. 7 shows that the sentence 741 links to a card 710 for keyword selection. Hence, as shown in FIG. 6B at 408, the card 710 from which the keyword was first selected is displayed again, ending the conversation. In this way, the links between cards and sentences, shown in FIG. 7, define the flow of conversation shown in FIGS. 4A–4C, 5A–5C and 6A and 6B.

Figure 8A:
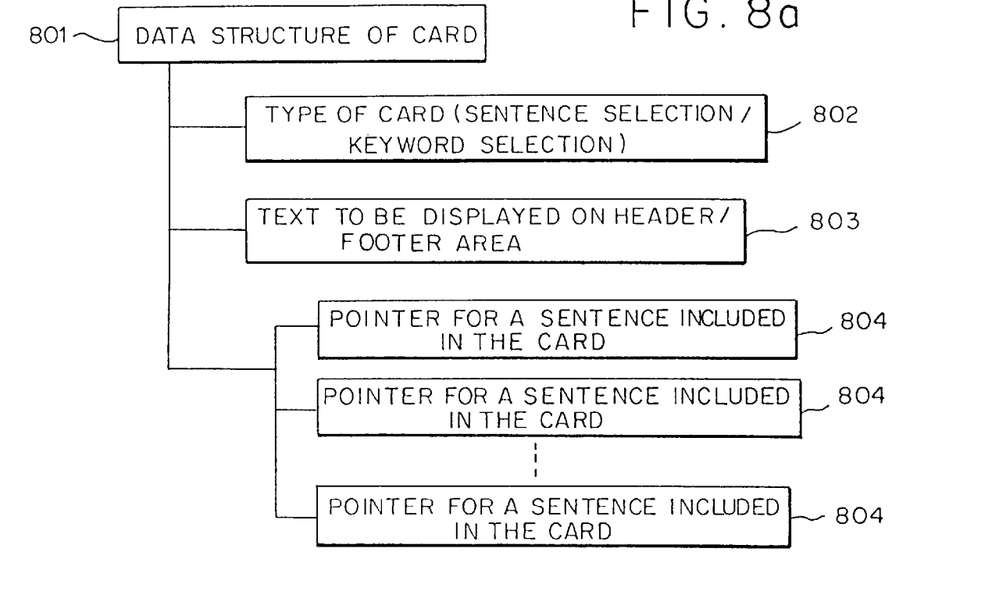
FIGS. 8A and 8B are schematic diagrams illustrating the data structure of the present invention.
Figure 8B:
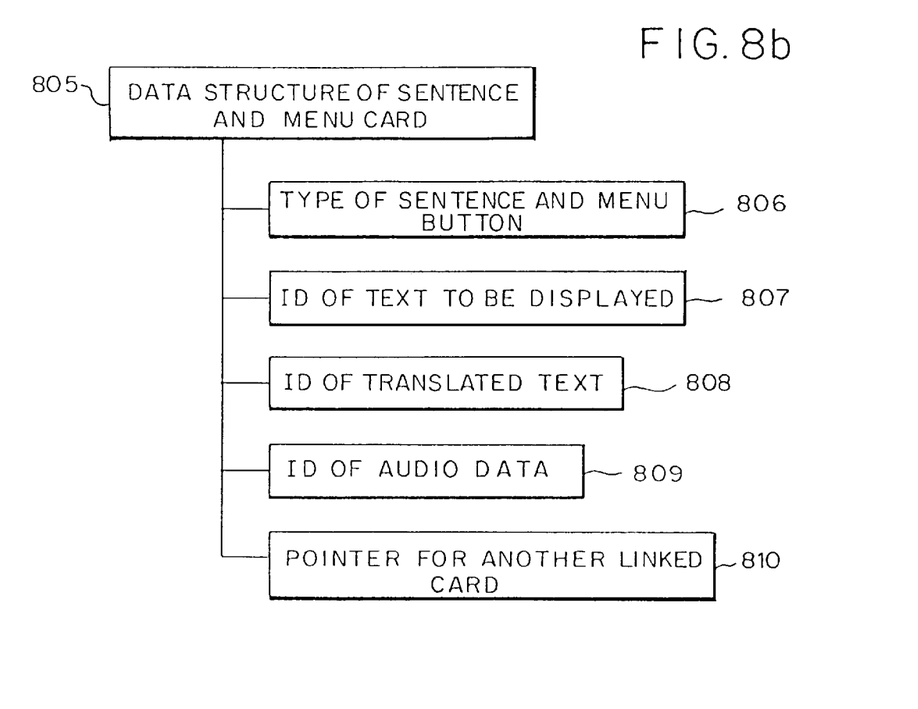

FIGS. 8A–8B illustrate the data structures of a card and a sentence. In the data structure 801 of a card, the defined data includes at least a card type indicating whether the card is used for sentence selection or keyword selection, data 803 of the text shown on the header/footer areas, and pointers 804 for the sentences included in the card. One card can contain an arbitrary number (one or more) of sentences. Sentences and menu buttons can be defined in basically the same data structure. In the data structure 805, the defined data includes at least a type of sentence or menu button 806, an ID 807 of a text to be displayed, an ID of a translated text 808, an ID 809 for audio data to be voiced, and a pointer 810 for a card linked with the sentence or menu button. For a sentence including choices, like the sentence 723 of FIG. 4C, a plurality of data 808, 809, 810 are defined.

Figure 9:
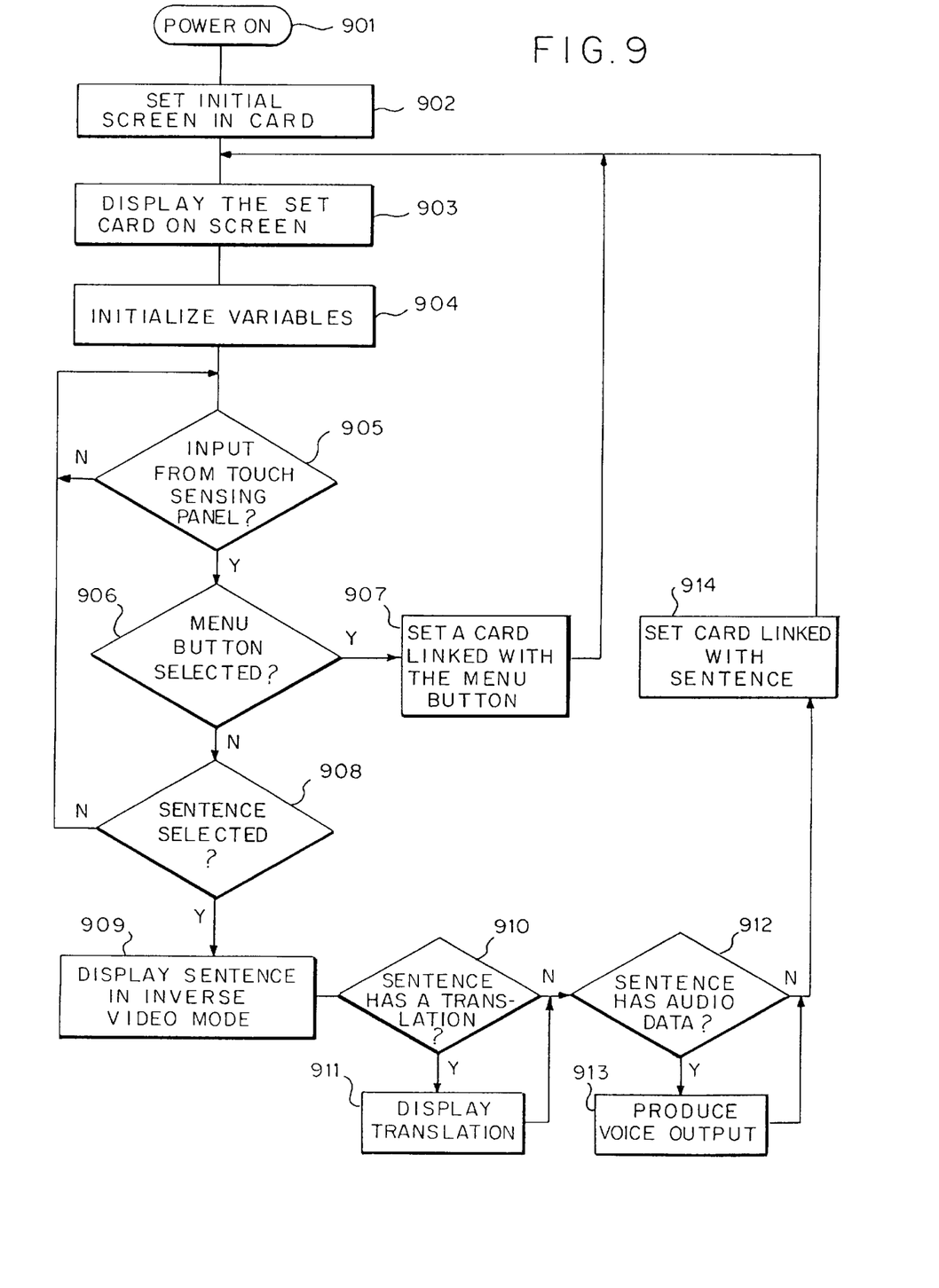
FIG. 9 is a flowchart of the processing performed by the control program of the present invention.

FIG. 9 shows a flowchart of a basic processing performed by the electronic interpreter control program according to the defined data using the CPU 201. When power is turned on at step 901, a card for displaying the initial screen on the display is set at step 902, and the processing from the next step are repeated. At step 903, the control program loads the screen display driver program 304 explained in reference to FIG. 3 and displays the card set in the display card (the first screen is the initial screen). At step 904 the variables are initialized. At step 905 an input from the touch sensing panel through the tablet input driver program 305 explained referring to FIG. 3 is prompted. Upon receiving an input from the touch sensing panel, the control program checks if the object selected at step 906 is a menu button. If the object is a menu button, a card linked with the menu button is set in the display card at step 907, the processing returns to step 903, and the steps are repeated.

When the object selected at step 906 is not a menu button, the control program checks if the object is a sentence at step 908. If the selected object is neither a menu button nor a sentence, the program returns to step 905. If the selection is a sentence, the image display driver program 304 is loaded at step 909 and the selected sentence is displayed in reverse video mode. Next, at step 910 it is determined whether or not the sentence has a translation and, if so, at step 911 the image display driver program 304 is called up to display the translated sentence. At step 912 the control program checks if there is audio data defined for the sentence and, if so, the audio output driver program 303 of FIG. 3 is called up and the translated sentence is voiced at step 913. Further, at step 914 a card linked with the sentence is set in the display card and the processing returns to step 903, repeating the processing from the screen display step.

Based on the above, the first embodiment of the present invention provides an electronic interpreter for interpreting sentences between a first person and a second person. The electronic interpreter includes a memory for storing sentence data in a data structure having a plurality of sets of sentences including translations of the sentences, wherein each sentence of each set of sentences is linked to another of the sets of sentences, and a data processing unit. The data processing unit performs the following steps:

(a) retrieving a set of sentences from the memory in response to a keyword input from the first person using an input device, (b) displaying the set of sentences on a display, (c) selecting a sentence from the set of sentences in response to an input from the first person using the input device, (d) displaying a translation of the selected sentence on the display along with another set of sentences linked to the selected sentence, (e) selecting a sentence from the set of sentences in response to an input from the second person using the input device, (f) displaying a translation of the selected sentence on the display along with yet another set of sentences linked to the selected sentence, and (g) repeating steps (c)–(f) until a keyword has been input from the first person using the input device.

Figure 10:
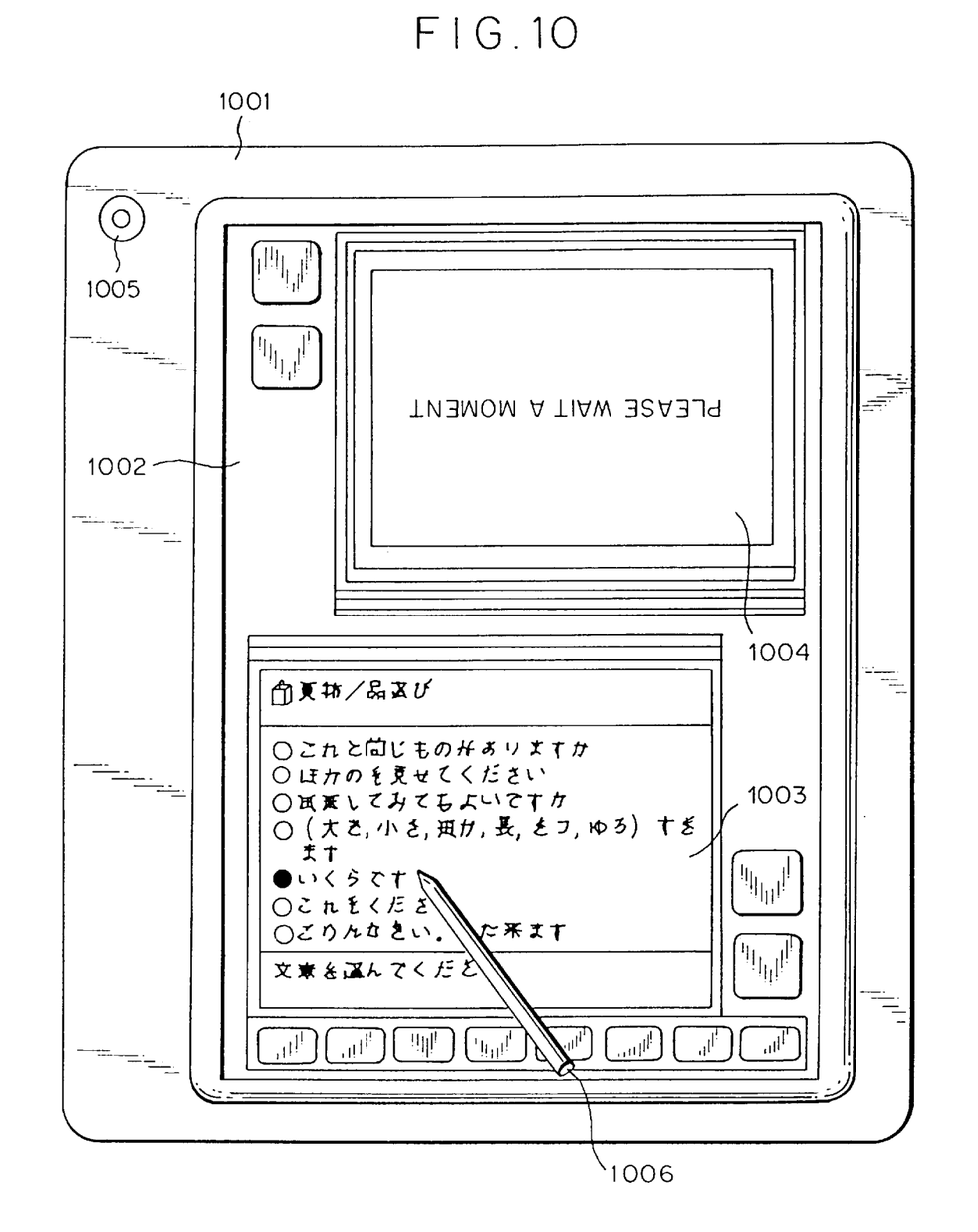
FIG. 10 is a diagram illustrating an external view of another electronic interpreter of the present invention.
Figure 11:
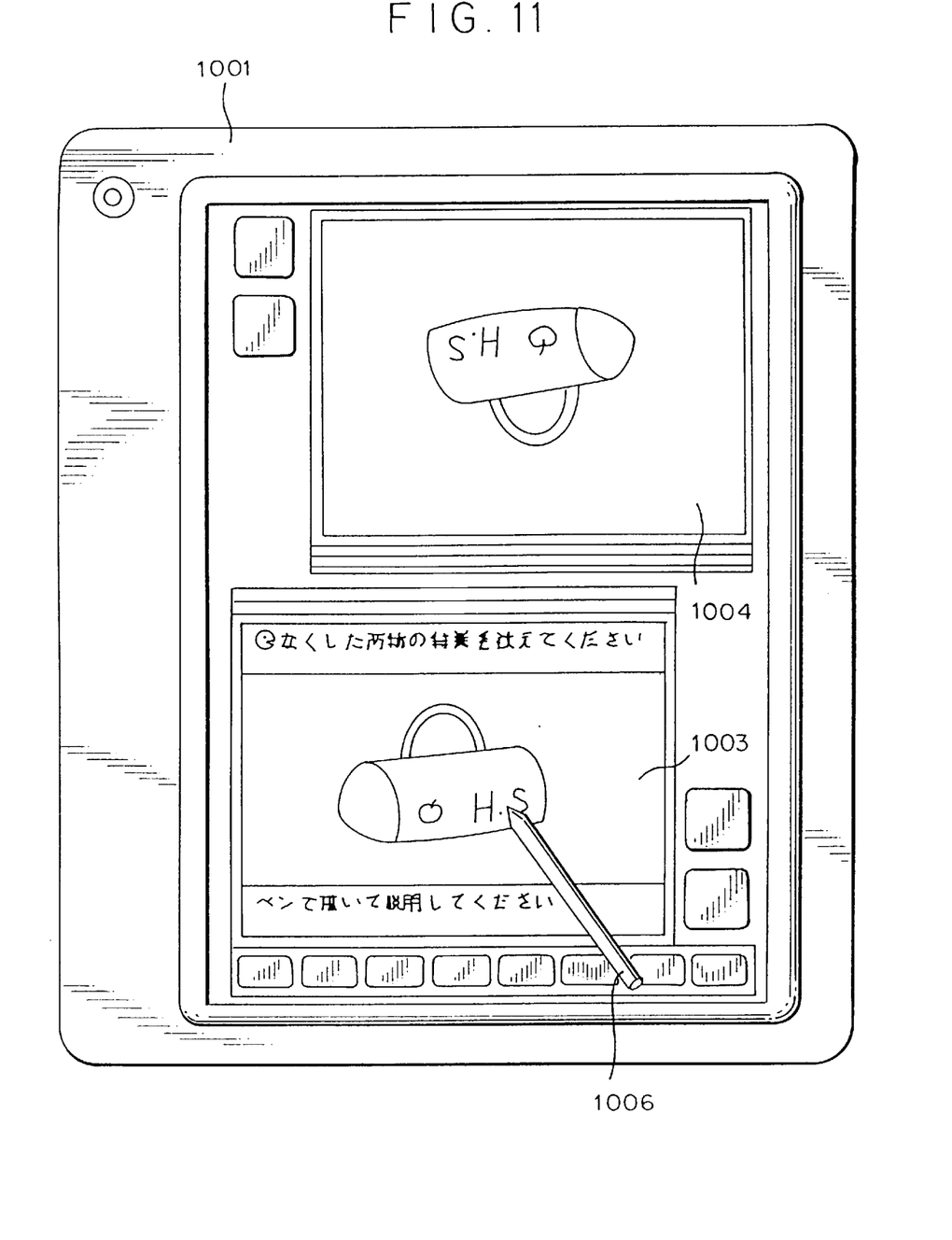
FIG. 11 is a diagram illustrating an example of the application of the hand-written information entering function.

Another embodiment of the present invention will be described referring to FIGS. 10 and 11. FIG. 10 shows the appearance of the second embodiment. This embodiment has a translation application software installed on a pen-based PDA (Personal Data Assistant) or a so-called pen-based PC (a portable personal computer to which data can be entered by pen-inputting) 1001.

This embodiment includes a display 1002 which has a single screen that is a combination of an ordinary liquid crystal display capable of pen-inputting and a touch sensing panel. Of course a keyboard may be provided in place of the touch sensing panel. When the translation application software is started, a window 1003 for displaying sentences in the Japanese language and a window 1004 for displaying sentences in the English language are displayed separately on the screen and software buttons are also displayed as required. Voice output is produced through a speaker 1005 which is an accessory of the pen-based PC. The sentence selection procedure and the process of conversation are almost the same as those of the first embodiment, and sentences shown in the window 1003 for the user or the window 1004 for the companion are chosen with a pen 1006.

In the second embodiment in addition to the sentence selection, hand-written data can be entered as required by using the pen. For example, FIG. 11 illustrates a case where his/her user, in response to a question from the companion, explains what a missing bag looks like by drawing the bag. The illustration drawn in the user window 1003 is also displayed in the companion window 1004 to facilitate the communication. The function of entering hand-written information is particularly useful when words are ineffective in describing, for example, the feature of an article or the location of the user's destination.

With respect to the first and second embodiments, although a portable electronic interpreter using the liquid crystal display and the touch sensing panel was taken as an example, other types of electronic interpreters according to the present invention can be realized as long as the data structure of the sentences is defined in the format proposed in the present invention and the interpreter includes means for displaying candidates such as sentences and keywords, means for selecting a desired candidate, and means for displaying the translation of the selected sentence and/or producing voiced output of the translation. Such an electronic interpreter may be applied as a multilingual electronic interpreter used at the information desk of hotels and at windows of various facilities and institutions or as a single language electronic interpreter for translating between different transliterating systems of the same language or providing audio output in one direction for translating between a hearing impaired (deaf) individual and a hearing person.

Further, with respect to the first and second embodiments although an electronic interpreter in which the translation is performed between Japanese and English was taken as an example the present invention can of course be applied to interpret conversations between individuals in other languages, such as, for instance, Japanese, Spanish and German, Chinese.

Using the electronic interpreter of the present invention where one of a plurality of predefined sentences are selected, it is possible, for even persons who do not mutually understand the languages, to communicate with each other because when a sentence is selected, a set of sentences correlated to the selected sentences can be called up.

Further, since a plurality of display areas are provided and sentences in different languages are displayed in separated areas, information required by the user and the companion is displayed independently of each other, ensuring smooth conversation without interruption or interference of thought processes of the user and companion due to unnecessary or relevant information.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. An electronic interpreter for interpreting sentences between a first person and a second person, comprising:

a memory for storing sentence data in a data structure having a plurality of sets of sentences including translations of said sentences, wherein each sentence of each set of sentences is linked to another of said sets of sentences; and a data processing unit for:

(a) retrieving a set of sentences from said memory in response to a keyword input from said first person using an input device, (b) displaying said retrieved set of sentences on a display, (c) selecting a sentence from said displayed set of sentences in response to an input from said first person using said input device, (d) displaying a translation of said selected sentence on said display along with another set of sentences linked to the selected sentence, (e) selecting another sentence from said another set of sentences in response to an input from said second person using said input device, (f) displaying a translation of said another selected sentence on said display along with yet another set of sentences linked to said another selected sentence, and (g) repeating steps (c)–(f) until a keyword has been input from said first person using said input device.

2. An electronic interpreter according to claim 1, wherein said display comprises a liquid crystal display; and wherein said input device comprises a touch sensing panel bonded to said liquid crystal display.

3. An electronic interpreter according to claim 1, wherein said input device comprises:

means for entering, from either of said first and second persons, hand-written characters or illustrations and displaying said hand-written characters or illustrations on said display.

4. An electronic interpreter according to claim 1, wherein said plurality of sets of sentences includes a plurality of sets of first sentences and a plurality of sets of second sentences, and wherein said set of sentences retrieved from said memory in response to a key word input from said first person is a set of first sentences, said another set of sentences is a set of second sentences and said another set of sentences is a set of first sentences.

5. An electronic interpreter according to claim 4, wherein said sets of first sentences are written in a first language and said sets of second sentences are written in a second language.

6. An electronic interpreter according to claim 5, wherein said sets of second sentences are sets of answer sentences in response to said first sentences to which said sets of second sentences are linked.

7. An electronic interpreter according to claim 5, wherein said display includes at least two display areas;

wherein said set of first sentences is displayed in a first display area and said translation of a selected first sentence is displayed in a second display area; and wherein said set of second sentences is displayed in said second display area and said translation of a selected second sentence is displayed in said first display area.

8. An electronic interpreter according to claim 7, wherein said electronic interpreter is constructed in the form of a book which can be folded and closed when not used and unfolded and opened when used; and wherein said first display area is provided on the inside surface of one side of said book and said second display area is provided on the inside surface of the other side of said book.

9. An electronic interpreter according to claim 5, wherein, when said translation of a selected first sentence is displayed, an audio output corresponding to said translation is output by an output device; and wherein, when said translation of said selected second sentence is displayed, an audio output corresponding to said translation is output by said output device.

10. An electronic interpreter according to claim 5, wherein said first and second languages are different languages.

11. An electronic interpreter according to claim 5, wherein said first and second languages are the same language.

12. An electronic interpreter according to claim 4, wherein said sets of second sentences are sets of answer sentences in response to said first sentences to which said sets of second sentences are linked.

13. An electronic interpreter according to claim 4, wherein said display includes at least two display areas;

wherein said set of first sentences is displayed in a first display area and said translation of a selected first sentence is displayed in a second display area; and wherein said set of second sentences is displayed in said second display area and said translation of a selected second sentence is displayed in said first display area.

14. An electronic interpreter according to claim 13, wherein said electronic interpreter is constructed in the form of a book which can be folded and closed when not used and unfolded and opened when used; and wherein said first display area is provided on the inside surface of one side of said book and said second display area is provided on the inside surface of the other side of said book.

15. An electronic interpreter according to claim 4, wherein, when said translation of a selected first sentence is displayed, an audio output corresponding to said translation is output by an output device; and wherein, when said translation of said selected second sentence is displayed, an audio output corresponding to said translation is output by said output device.

16. A method of interpreting sentences between a first person and a second person, said method comprising the steps of:

(a) storing sentence data in a data structure having a plurality of sets of sentences including translations of said sentences, wherein each sentence of each set of sentences is linked to another of said sets of sentences;

(b) retrieving a set of sentences from said memory in response to a keyword input from said first person;

(c) displaying said set of sentences on a display;

(d) selecting a sentence from said set of sentences in response to an input from said first person;

(e) displaying a translation of said selected sentence on said display along with another set of sentences linked to the selected sentence;

(f) selecting a sentence from said another set of sentences in response to an input from said second person;

(g) displaying a translation of said selected sentence on said display along with a another set of sentences linked to said selected sentence; and (h) repeating steps (d)–(g) until a keyword has been input from said first person.

17. A method according to claim 16, wherein said display comprises a liquid crystal display; and wherein inputs from said first and second persons is provided by a touch sensing panel bonded to said liquid crystal display.

18. A method according to claim 16, wherein said input device comprises:

means for entering, from either of said first and second persons, hand-written characters or illustrations and displaying said hand-written characters or illustrations on said display.

19. A method according to claim 16, wherein said plurality of sets of sentences includes a plurality of sets of first sentences and a plurality of sets of second sentences, and wherein said set of sentences retrieved from said memory in response to a key word input from said first person is a set of first sentences, said another set of sentences is a set of second sentences and said another set of sentences is a set of first sentences.

20. A method according to claim 19, wherein said sets of second sentences are sets of answer sentences to first sentences to which said sets of second sentences are linked.

21. A method according to claim 19, wherein said display includes at least two display areas;

wherein said set of first sentences is displayed in a first display area and said translation of said selected first sentence is displayed in a second display area; and wherein said set of second sentences is displayed in said second display area and said translation of said selected second sentence is displayed in said first display area.

22. A method according to claim 21, wherein said steps are performed by an electronic interpreter which is constructed in the form of a book which can be folded and closed when not used and unfolded and opened when used; and wherein said first display area is provided on the inside surface of one side of said book and said second display area is provided on the inside surface of the other side of said book.

23. A method according to claim 19, further comprising the steps of:
when said translation of a selected first sentence is displayed, outputting an audio output corresponding to said translation by an output device; and
when said translation of said selected second sentence is displayed, outputting an audio output corresponding to said translation by said output device.

24. A method according to claim 16, wherein said sets of first sentences are written in a first language and said sets of second sentences are written in a second language.

25. A method according to claim 24, wherein said sets of second sentences are sets of answer sentences to first sentences to which said sets of second sentences are linked.

26. A method according to claim 24, wherein said display includes at least two display areas;
wherein said set of first sentences is displayed in a first display area and said translation of said selected first sentence is displayed in a second display area; and
wherein said set of second sentences is displayed in said second display area and said translation of said selected second sentence is displayed in said first display area.

27. A method according to claim 26, wherein said steps are performed by an electronic interpreter which is constructed in the form of a book which can be folded and closed when not used and unfolded and opened when used; and
wherein said first display area is provided on the inside surface of one side of said book and said second display area is provided on the inside surface of the other side of said book.

28. A method according to claim 24, further comprising the steps of:
when said translation of a selected first sentence is displayed, outputting an audio output corresponding to said translation by an output device; and
when said translation of said selected second sentence is displayed, outputting an audio output corresponding to said translation by said output device.

29. A method according to claim 24, wherein said first and second languages are different languages.

30. A method according to claim 24, wherein said first and second languages are the same language.

\* \* \* \* \*